United States Patent
Chen

(10) Patent No.: US 11,982,301 B2
(45) Date of Patent: May 14, 2024

(54) CONNECTING ASSEMBLY

(71) Applicant: CHICONY ELECTRONICS CO., LTD., New Taipei (TW)

(72) Inventor: Chia-Hao Chen, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 35 days.

(21) Appl. No.: 17/989,213

(22) Filed: Nov. 17, 2022

(65) Prior Publication Data

US 2023/0383776 A1 Nov. 30, 2023

(30) Foreign Application Priority Data

May 31, 2022 (TW) .................. 111120283

(51) Int. Cl.
*F16B 2/06* (2006.01)
*F16M 11/04* (2006.01)
*G03B 17/56* (2021.01)

(52) U.S. Cl.
CPC ............... *F16B 2/06* (2013.01); *F16M 11/04* (2013.01); *G03B 17/561* (2013.01)

(58) Field of Classification Search
CPC .......... F16B 2/06; F16M 11/04; G03B 17/561
See application file for complete search history.

(56) References Cited

U.S. PATENT DOCUMENTS

| | | | | |
|---|---|---|---|---|
| 6,196,504 B1 * | 3/2001 | Lemke | ................. | F16M 11/041 396/428 |
| 2017/0346522 A1 * | 11/2017 | Yan | ..................... | H04B 1/3877 |
| 2019/0271903 A1 * | 9/2019 | Wilson | ................. | F16M 11/041 |

FOREIGN PATENT DOCUMENTS

| | | | |
|---|---|---|---|
| CN | 215891625 U | * | 2/2022 |
| FR | 2518216 A1 | * | 6/1983 |

(Continued)

OTHER PUBLICATIONS

FALCAM F22 Basic Quick Release Plate Kit sold on amazon. first available date: Oct. 8, 2021, https://www.amazon.com/F22-Mounting-Accessory-Filmmaker-Photographer/dp/B09J164PHJ (Year: 2021).*

(Continued)

*Primary Examiner* — Terrell L McKinnon
*Assistant Examiner* — Ding Y Tan
(74) *Attorney, Agent, or Firm* — MUNCY, GEISSLER, OLDS & LOWE, P.C.

(57) ABSTRACT

A connecting assembly is applied to connect a first housing and a second housing. The connecting assembly includes a general connecting member, a connecting base, and a clamping member. The general connecting member connects to the first housing. The general connecting member includes an accommodating portion and at least one opening. The accommodating portion is located inside the general connecting member. The opening is disposed on a side wall of the general connecting member and communicates with the accommodating portion. The connecting base is disposed on the second housing. The connecting base includes a main body disposed in the accommodating portion. The clamping member includes a flat portion and at least one clamping portion. The clamping portion extends from one end of the flat portion toward the connecting base, and the clamping portion passes through the opening and presses against the main body of the connecting base.

11 Claims, 8 Drawing Sheets

(56) References Cited

FOREIGN PATENT DOCUMENTS

| | | | |
|---|---|---|---|
| TW | I730648 B | * | 6/2021 |
| TW | I748583 B | * | 12/2021 |

OTHER PUBLICATIONS

SnapLock Plate Adapter from PGYTECH, dated by archive.org: Oct. 21, 2021, https://www.pgytech.com/products/snaplock-plate-adapter (Year: 2021).*

* cited by examiner

CONNECTING ASSEMBLY

BACKGROUND

1. Technical Field

The present disclosure relates to a connecting assembly; more particularly, the present disclosure relates to a connecting assembly applied to connect two housings.

2. Description of the Related Art

Generally, when it comes to assembling two separate items (such as two housings), it is required to utilize a connecting structure to connect the items to each other. For some devices with multiple purposes or in multiple states, the connections among multiple items have to be detachable. Further, it is required to provide a general connecting member for the housing of a main device for connecting different items, in order to switch purposes or states.

For example, the bottom of the housing of a camera is usually provided with a female thread (i.e., a general connecting member), and its corresponding item, such as a tripod, a selfie stick or a base for mounting to a monitor is provided with a screw. As a result, the camera can be assembled to the tripod, the selfie stick or the base for mounting to a monitor by way of screwing (in a detachable manner), and thus the camera can be used for different purposes such as outdoor photography, fixed point photography, selfie taking or video recording, respectively.

However, the most common general connecting member is a female thread, which is connected to other items by way of screwing, and thus making the assembly process very inconvenient and time consuming.

SUMMARY

In view of the above problems, a main object of the present disclosure is to provide a connecting assembly, which utilizes a novel structure including a general connecting member, a connecting base and a clamping member in order to solve the problem of time-consuming and inconvenient assembly occurred while using a conventional general connecting member.

To achieve the abovementioned object, the present disclosure provides a connecting assembly, which is applied to connect a first housing and a second housing. The connecting assembly comprises a general connecting member, a connecting base and a clamping member. The general connecting member is connected to the first housing. The general connecting member comprises an accommodating portion and at least one opening. The accommodating portion is located inside the general connecting member. The opening is disposed on a side wall of the general connecting member, and the opening communicates with the accommodating portion. The connecting base is disposed on the second housing. The connecting base comprises a main body. The main body is disposed in the accommodating portion of the general connecting member. The clamping member comprises a flat portion and at least one clamping portion. The flat portion is disposed on a top portion of the general connecting member. The clamping portion extends from one end of the flat portion toward the connecting base, and the clamping portion passes through the opening and presses against the main body of the connecting base.

According to one embodiment of the present disclosure, the connecting base further comprises an annular portion. The annular portion is located on a bottom edge of the main body, and the annular portion extends outwardly from the main body.

According to one embodiment of the present disclosure, an outer diameter of the annular portion is greater than an outer diameter of the general connecting member.

According to one embodiment of the present disclosure, the second housing comprises a slot, and the annular portion is disposed in the slot of the second housing.

According to one embodiment of the present disclosure, the second housing comprises a first propping portion and a second propping portion. The first propping portion is located in the slot and is propped against a lower surface of the annular portion. The second propping portion is propped against an upper surface of the annular portion.

According to one embodiment of the present disclosure, the second housing comprises a first propping portion and a second propping portion. The first propping portion is located in the slot and is propped against a lower surface of the annular portion. The connecting assembly further comprises a washer disposed on an upper surface of the annular portion, and the second propping portion is propped against the washer.

According to one embodiment of the present disclosure, the main body comprises a groove, and the clamping portion comprises a protrusion. The protrusion is disposed in the groove when the clamping portion passes through the opening.

According to one embodiment of the present disclosure, the main body comprises a limit portion. The limit portion is located in the opening when the main body is disposed in the accommodating portion.

According to one embodiment of the present disclosure, the general connecting member comprises a screw hole portion, and the connecting assembly further comprises a screw. The screw is used for passing through the screw hole portion for being screwed to the first housing.

According to one embodiment of the present disclosure, the clamping portion comprises a through hole located on the flat portion. The through hole is disposed to the outside of the screw hole portion.

According to one embodiment of the present disclosure, the general connecting member comprises an internal thread located in the accommodating portion.

As described above, the connecting assembly of the present disclosure comprises a general connecting member, a connecting base, and a clamping member. The general connecting member is connected to a first housing, and the connecting base is disposed on a second housing. The general connecting member comprises an accommodating portion and at least one opening. The opening is disposed on a side wall of the general connecting member, and the opening communicates with the accommodating portion. The connecting base comprises a main body, which is disposed in the accommodating portion of the general connecting member. At least one clamping portion of the clamping member passes through the opening and presses against the main body of the connecting base, so as to easily assemble the general connecting member and the connecting base. Further, the main body of the connecting base is directly disposed in the accommodating portion without connecting to other objects by screwing like a conventional female thread does, the effect of easy assembly and time-saving is thereby achieved. Moreover, the connecting assembly can also be used as a quick-release connecting assembly.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

Figure 1:
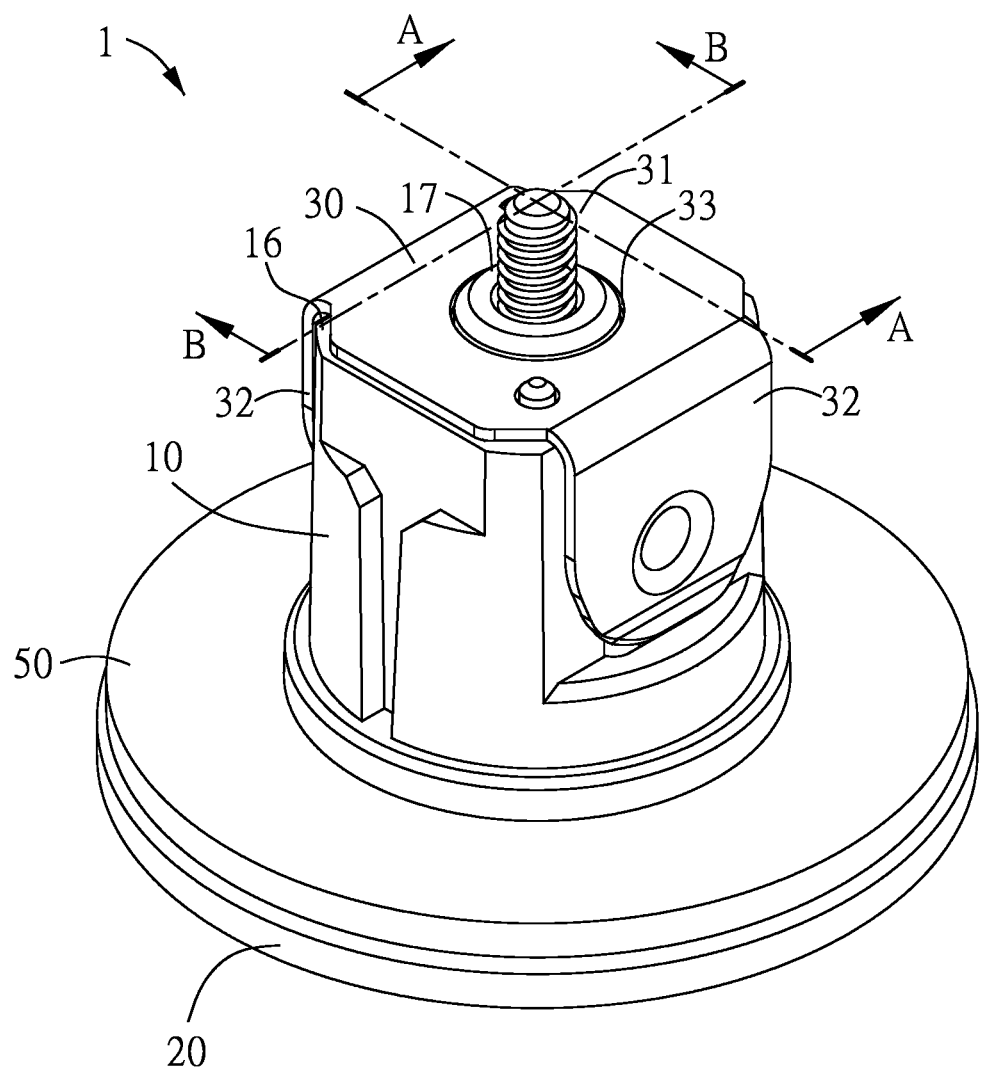
FIG. 1 illustrates a schematic drawing of a connecting assembly according to one embodiment of the present disclosure.
Figure 2:
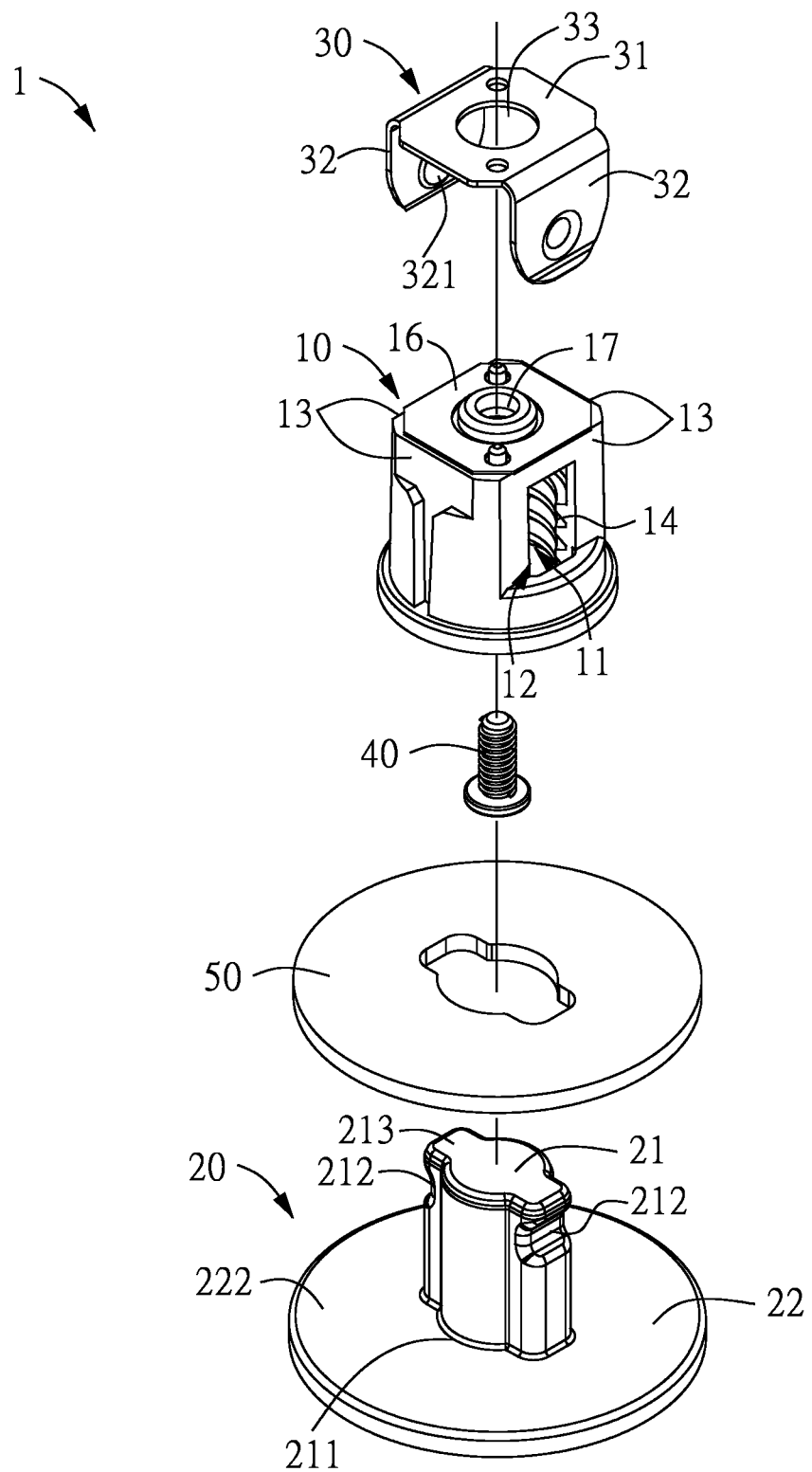
FIG. 2 illustrates an exploded view of the connecting assembly as shown in FIG. 1.
Figure 3A:
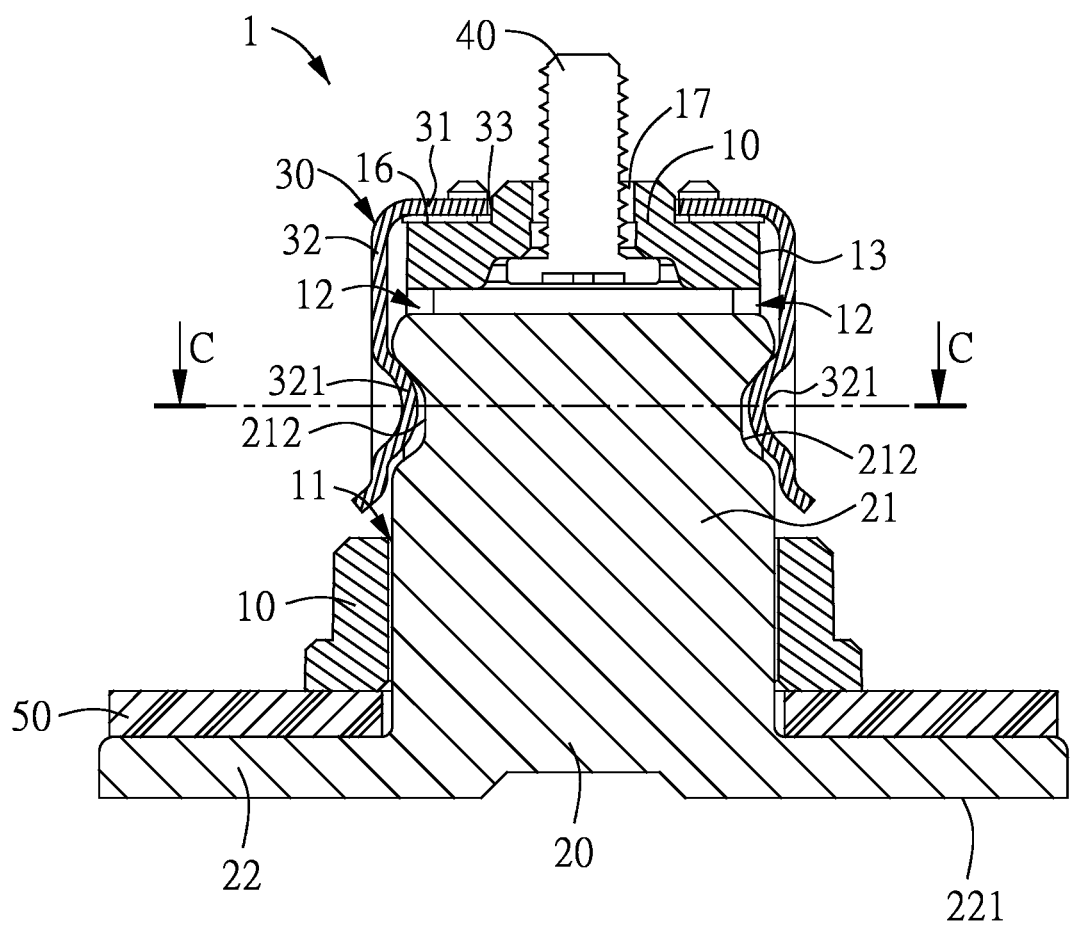
FIG. 3A illustrates a cross-sectional view of the connecting assembly along the A-A side of FIG. 1.
Figure 3B:
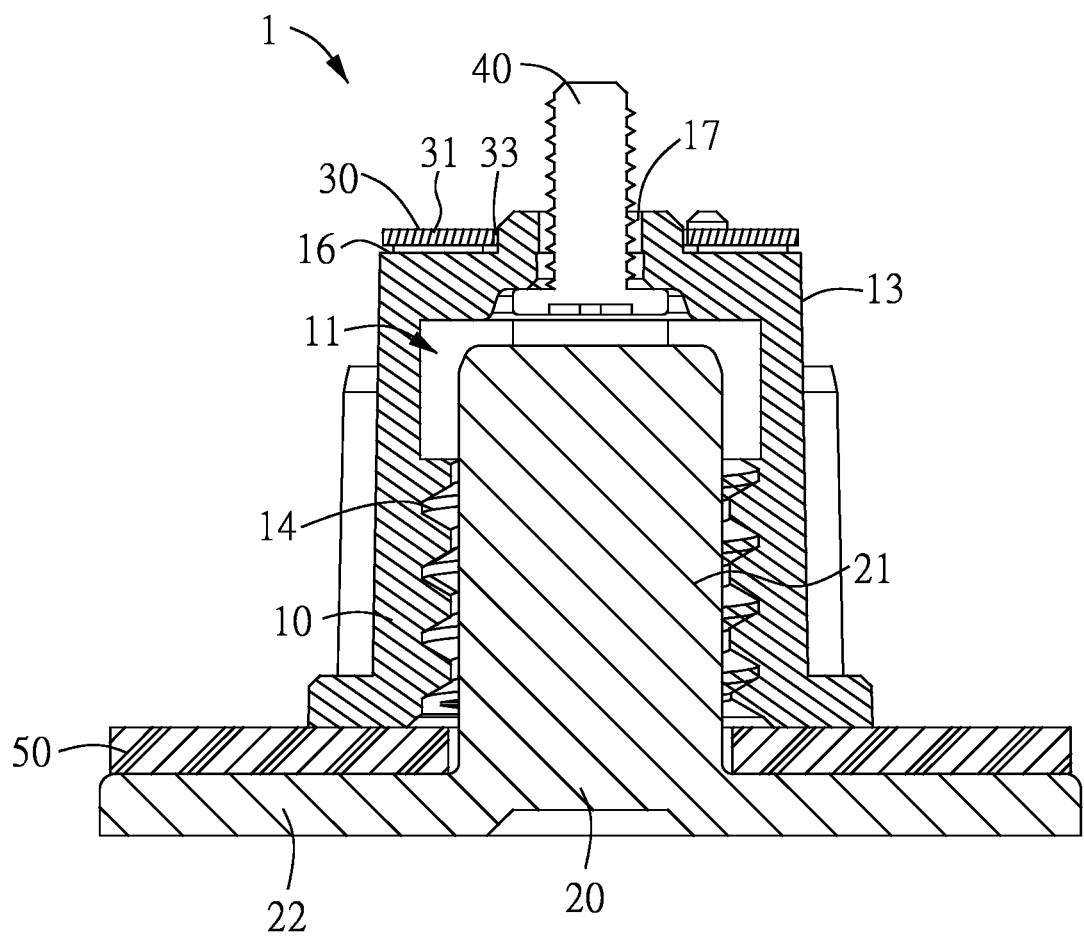
FIG. 3B illustrates a cross-sectional view of the connecting assembly along the B-B side of FIG. 1.
Figure 4:
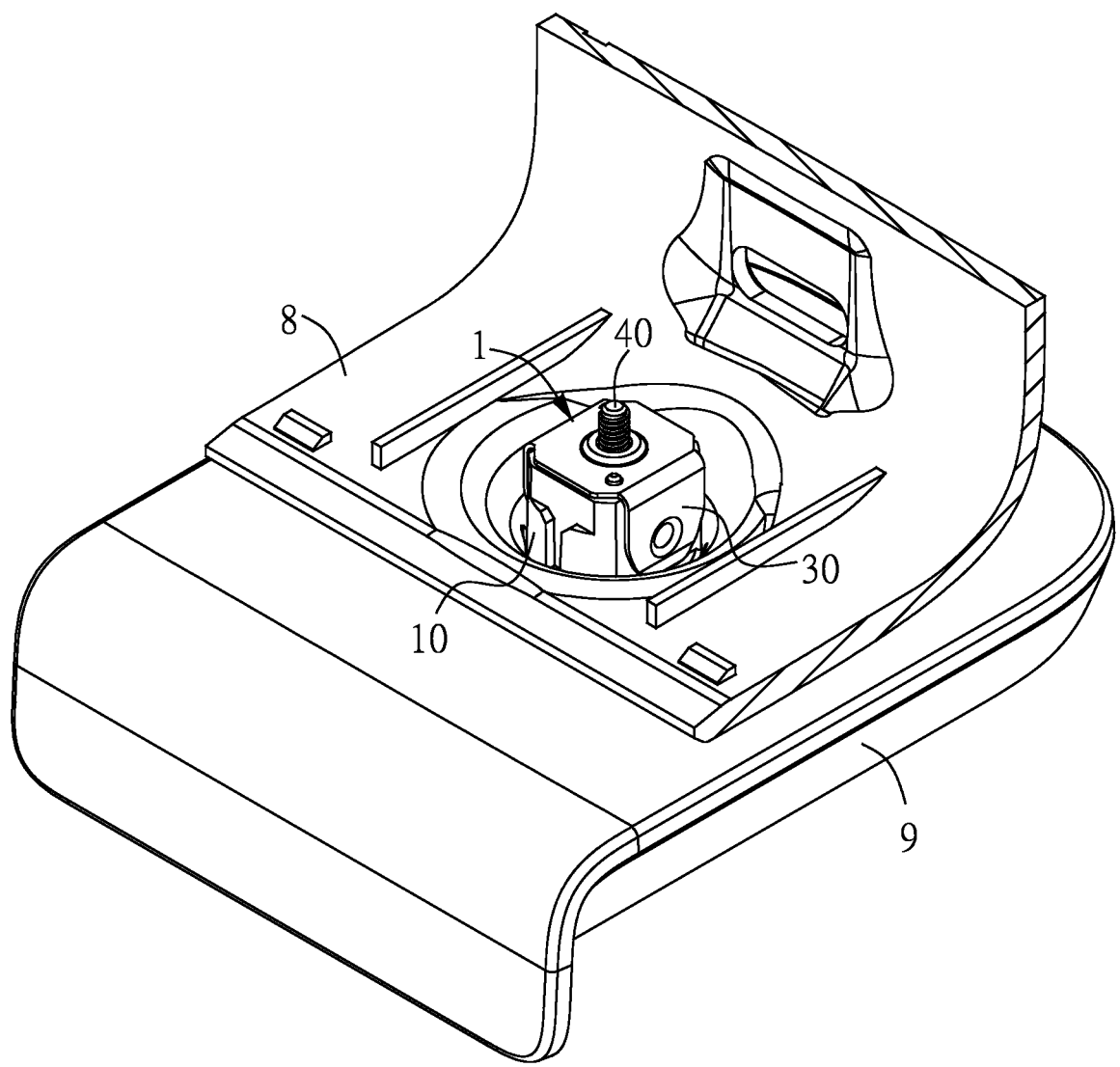
FIG. 4 illustrates a schematic drawing showing the connecting assembly of FIG. 1 being installed in a first housing and a second housing.
Figure 5:
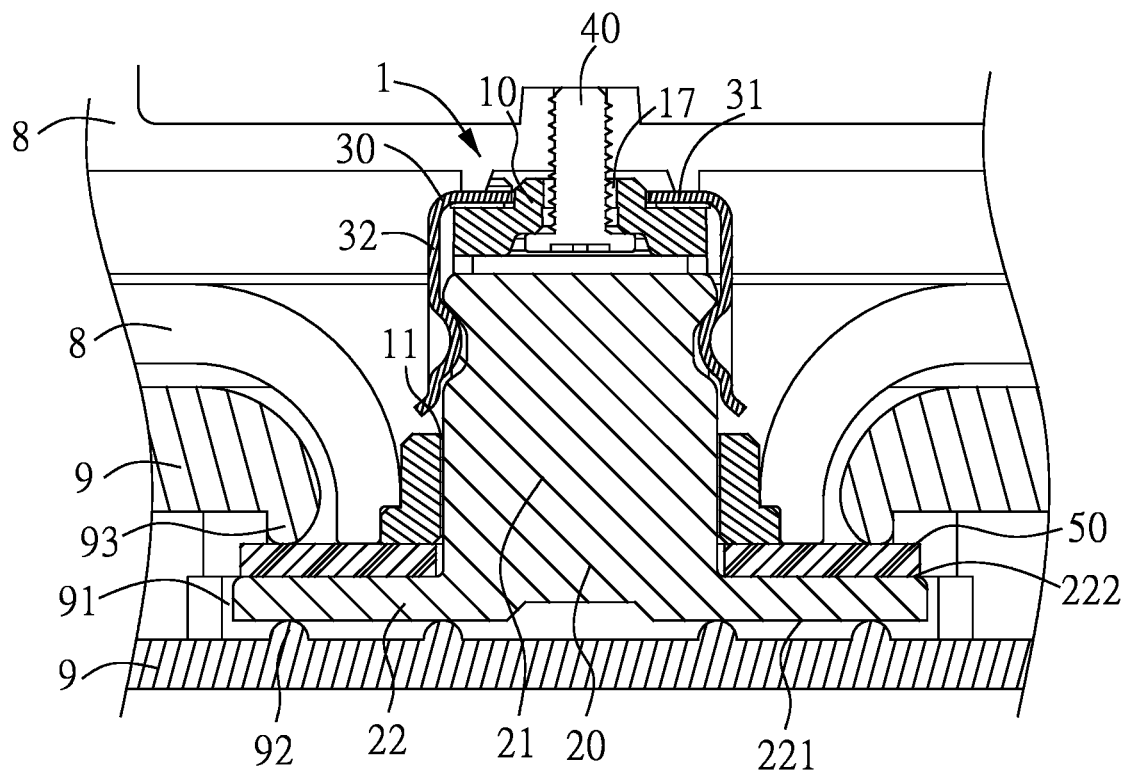
FIG. 5 illustrates a cross-sectional view of the connecting assembly, the first housing and the second housing as shown in FIG. 4.

FIG. 1 illustrates a schematic drawing of a connecting assembly according to one embodiment of the present disclosure; FIG. 2 illustrates an exploded view of the connecting assembly as shown in FIG. 1; FIG. 3A illustrates a cross-sectional view of the connecting assembly along the A-A side of FIG. 1; FIG. 3B illustrates a cross-sectional view of the connecting assembly along the B-B side of FIG. 1; FIG. 4 illustrates a schematic drawing showing the connecting assembly of FIG. 1 being installed in a first housing and a second housing; and FIG. 5 illustrates a cross-sectional view of the connecting assembly, the first housing and the second housing as shown in FIG. 4. Refer to the above figures as a reference for the following description. First, the connecting assembly 1 in this embodiment is applied to connect a first housing 8 and a second housing 9, as shown in FIG. 4 and FIG. 5. The first housing 8 is, for example, a camera housing; and the second housing 9 may be a base for mounting to a monitor. In the following description, the structure of the connecting assembly 1 will be described first, and the connection relation among the connecting assembly 1, the first housing 8 and the second housing 9 will be described later.

In this embodiment, the connecting assembly 1 comprises a general connecting member 10, a connecting base 20 and a clamping member 30. As shown in FIG. 2, the general connecting member 10 comprises an accommodating portion 11 and at least one opening 12. The accommodating portion 11 is located inside the general connecting member 10, which means, the inside of the general connecting member 10 is a hollow structure (i.e., the accommodating portion 11), which is used for accommodating the connecting base 20. Further, the opening 12 is disposed on a side wall 13 of the general connecting member 10, and the opening 12 communicates with the accommodating portion 11, as shown in FIG. 2. In one embodiment, the appearance of the general connecting member 10 can be cylindrical, the general connecting member 10 has a side wall 13, and the opening 12 can be disposed on any position of the side wall 13 merely for the purpose of communicating with the accommodating portion 11. In this embodiment, the outside of the general connecting member 10 is divided into four side walls 13, and the general connecting member 10 has two openings 12 respectively disposed on two opposite side walls 13.

Further, the general connecting member 10 in this embodiment can be used as a female thread. The size of the cylindrical part of the accommodating portion 11 can accommodate a cylindrical thread pillar, and the general connecting member 10 has an internal thread 14 (such as a ¼-UNC thread) located in the accommodating portion 11, as shown in FIG. 3B. It should be noted that the accommodating portion 11 of the general connecting member 10 is used for accommodating the connecting base 20, wherein the connecting base 20 does not has an external thread corresponding to the internal thread 14 and is directly inserted in the accommodating portion 11. As a result, the general connecting member 10 and the connecting base 20 in this embodiment are not connected by way of screwing; therefore, there is no such problem as inconvenient assembly like a conventional female thread does. In other words, the accommodating portion 11 of the general connecting member 10 in this embodiment is a jack hole for the connecting base 20 to be inserted in.

As shown in FIG. 2, FIG. 3A and FIG. 3B, the connecting base 20 comprises a main body 21. When the connecting base 20 is assembled to the general connecting member 10, the main body 21 is accommodated in the accommodating portion 11. Preferably, the connecting base 20 further comprises an annular portion 22. The annular portion 22 is located on a bottom edge 211 of the main body 21. In this embodiment, the bottom edge 211 is located on the end opposite to the clamping member 30. Further, the annular portion 22 extends outwardly from the main body 21. Preferably, an outer diameter of the annular portion 22 is greater than an outer diameter of the general connecting member 10. In other words, the area of the general connecting member 10 being projected to the annular portion 22 is smaller than the area of the annular portion 22 itself. When the connecting base 20 is assembled to the general connecting member 10, the main body 21 is located in the accommodating portion 11, and the annular portion 22 is located on the bottom and the outside of the general connecting member 10.

Moreover, the clamping member 30 comprises a flat portion 31 and at least one clamping portion 32. The clamping portion 32 extends from one end of the flat portion 31 toward the connecting base 20. That is, the clamping portion 32 extends downwardly from the edge of the flat portion 31. In this embodiment, the clamping member 30 has two clamping portions 32 respectively extending downwardly from two opposite sides of the flat portion 31. Preferably, the clamping member 30 can be a spring sheet, and the clamping portion 32 can clamp inwardly. As shown in FIG. 1 and FIG. 3A, the flat portion 31 is disposed on a top portion 16 of the general connecting member 10, and the downwardly-extending clamping portion 32 is located on the side wall 13 having the opening 12, such that the clamping portion 32 can pass through the opening 12 so as to press against the main body 21 of the connecting base 20, as shown in FIG. 3A, thereby assembling the general connecting member 10 and the connecting base 20.

Preferably, the main body 21 has a groove 212, and the clamping portion 32 has a protrusion 321. When the clamping portion 32 passes through the opening 12 of the general connecting member 10, the protrusion 321 is disposed to the groove 212, such that the clamping member 30 is engaged with the connecting base 20, and the relative positions of the general connecting member 10, the connecting base 20 and the clamping member 30 are fastened at the same time. If the inward-clamping force of the clamping portion 32 is too strong such that the clamping member 30 and the connecting base 20 are difficult to be assembled, a hole or other stress weakening structures could be formed on the connecting position between the flat portion 31 and the clamping portion 32. Due to the structures described above, the clamping portion 32 can be more flexible to open and close.

In other words, in this embodiment, the general connecting member 10 can easily assemble the general connecting member 10 and the connecting base 20 by means of the structure of the opening 12 and the clamping member 30. More specifically, in this embodiment, the main body 21 of the connecting base 20 is directly disposed in the accommodating portion 11 of the general connecting member 10 without connecting to other objects by screwing like a conventional female thread does, the effect of easy assembly and time-saving is thereby achieved. Further, the connecting assembly 1 in this embodiment can also be used as a quick-release connecting assembly 1.

Refer to FIG. 4 and FIG. 5. In this embodiment, the connecting assembly 1 is applied to connect the first housing 1 and the second housing 9. The general connecting member 10 is connected to the first housing 8, and the connecting base 20 is connected to the second housing 9. It should be noted that FIG. 4 only shows the bottom of the first housing 8 in order to display the connecting position of the connecting assembly 1, whereas the structure of the general connecting member 10 being connected to the first housing 8 is shown in FIG. 5. In this embodiment, the general connecting member 10 preferably has a screw hole portion 17, and the screw hole portion 17 is located on the top portion 16, as shown in FIG. 1, FIG. 2, FIG. 3A and FIG. 3B. The inside of the screw hole portion 17 is a screw hole, and the top of the screw hole portion 17 is slightly protruding for placing the clamping member 30. More specifically, the clamping member 30 can comprise a through hole 33, and the through hole 33 is located on the flat portion 31. When the flat portion 31 of the clamping member 30 is disposed on the top portion 16 of the general connecting member 10, the through hole 33 is sleeved onto the outside of the screw hole portion 17.

Correspondingly, the connecting assembly 1 further comprises a screw 40. The screw 40 can pass through the screw hole portion 17 from the accommodating portion 11 of the general connecting member 10, in order to be screwed to the first housing 8. Preferably, after the clamping member 30 is disposed to the general connecting member 10, the screw 40 would then pass through the screw hole portion 17 from the accommodating portion 11 in order to be fastened to the first housing 8. Finally, the connecting base 20 is placed in the accommodating portion 11, and the clamping portion 32 of the clamping member 30 is utilized to fasten the connecting base 20. In other embodiments, the general connecting member 10 can also be disposed to the first housing 8 by way of snapping or other engagement mechanisms without limiting the scope of the present disclosure.

In this embodiment, the second housing 9 has a slot 91. The annular portion 22 of the connecting base 20 is disposed in the slot 91 of the second housing 9, so as to dispose the connecting base 20 in the second housing 9. In one embodiment, the connecting base 20 can be firstly assembled to the second housing 9, and then assembled to the accommodating portion 11 of the general connecting member 10. In another embodiment, the connecting base 20 can be assembled to the general connecting member 10 at first, and finally the annular portion 22 of the connecting base 20 is placed in the slot 91 of the second housing 9. The above-mentioned two assembly methods can both connect the connecting assembly 1 to the first housing 8 and the second housing 9.

Preferably, the second housing 9 has a first propping portion 92 and a second propping portion 93. The first propping portion 92 is located in the slot 91, and the first propping portion 92 is propped against a lower surface 221 of the annular portion 22. Correspondingly, the connecting assembly 1 in this embodiment further comprises a washer 50, which is disposed on an upper surface 222 of the annular portion 22 of the connecting base 20, and the second propping portion 93 is propped against the washer 50. In this embodiment, the washer 50 can be made of, but not limited to, rubber, silicon or other materials having small friction coefficients.

The first propping portion 92 and the second propping portion 93 of the second housing 9 to be respectively propped against the lower surface 221 of the annular portion 22 and the washer 50, so that the connecting base 20 can be disposed in the second housing 9, and can also rotate within the slot 91. Specifically, the first propping portion 92 and the second propping portion 93 are respectively a protrusion, therefore they are respectively propped against the lower surface 221 of the annular portion 22 and the washer 50 by means of point contact. The point contact mechanism and the washer 50 can reduce the friction from the first propping portion 92 and the second propping portion 93 to the connecting base 20. Therefore, the first propping portion 92 and the second propping portion 93 can limit the connecting base 20 from moving downwardly or upwardly, but still provide the flexibility of letting the connecting base 20 rotate and move within the slot 91

According to the above structure, the first housing 8 can rotate with respect to the second housing 9, so as to achieve the effect of adjusting the angle of the first housing 8 (such as the camera housing). Specifically, when the first housing 8 is rotated, the entirety of the connecting assembly 1 can be driven by the general connecting member 10 to rotate at the same time. Further, when the connecting base 20 is rotated, the annular portion 22 would rotate within the slot 91 of the second housing 9, therefore the second housing 9 (such as the base for mounting to a monitor) would not rotate with the first housing 8 and the connecting assembly 1, thereby achieving the effect of adjusting the angle of the first housing 8 (such as the camera housing).

Figure 6:
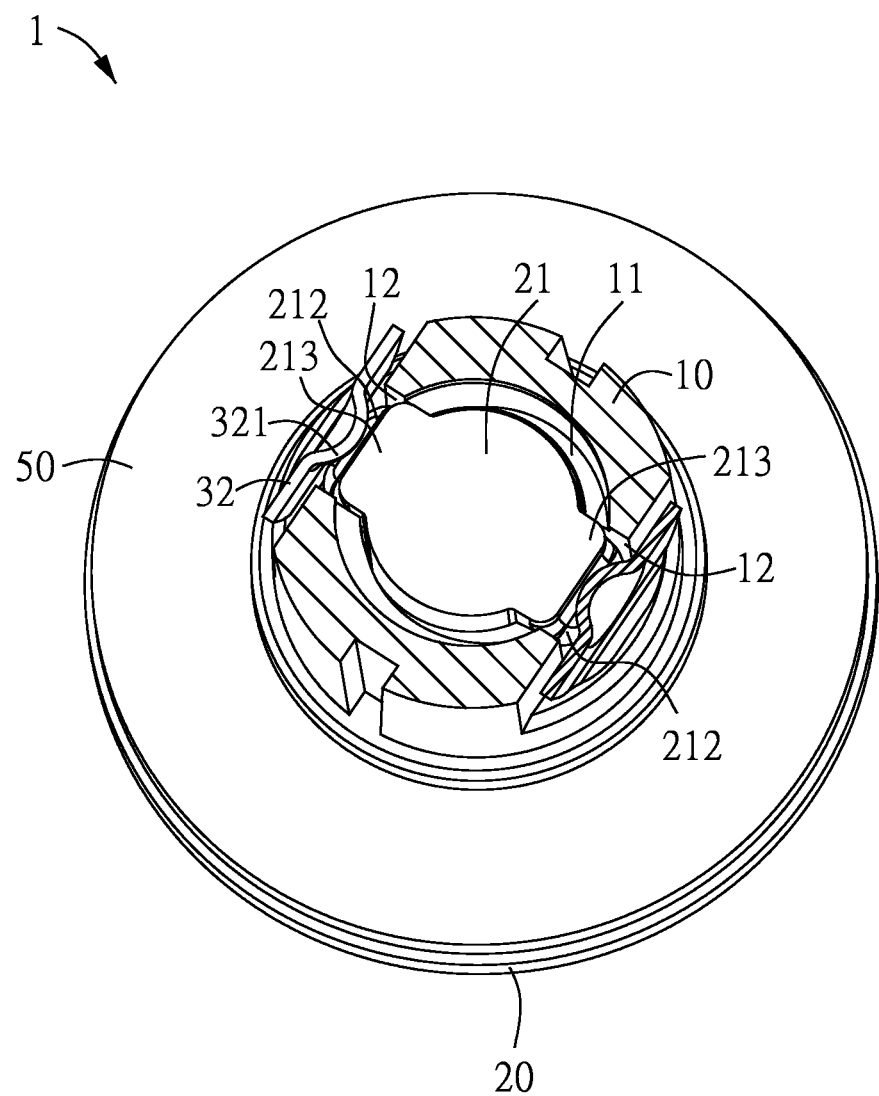
FIG. 6 illustrates a cross-sectional top view of the connecting assembly as shown in FIG. 3A.

Generally, the accommodating portion 11 of the general connecting member 10 can be cylindrical. In order to make sure that when the general connecting member 10 rotates, it can drive the connecting base 20 to rotate together, preferably the main body 21 has a structure for position-limiting. FIG. 6 illustrates a cross-sectional top view of the connecting assembly along the C-C side of FIG. 3A. Refer to both FIG. 2 and FIG. 6, in this embodiment, the main body 21 of the connecting base 20 has two limit portions 213 respectively located on two opposite sides of the main body 21. Specifically, the main structure of the main body 21 is a cylinder, which extends outwardly from two symmetrical side walls to form protrusions for being used as the limit portions 213, and the groove 212 is located on the limit portions 213 (as shown in FIG. 2). When the main body 21 of the connecting base 20 is accommodated in the accommodating portion 11 of the general connecting member 10, the limit portions 213 are located within the opening 12 so as to achieve the position-limiting effect, as shown in FIG. 6. In other embodiments, the main body 21 can have only one limit portion 213, which can similarly achieve the position-limiting effect without limiting the scope of the present disclosure.

Figure 7:
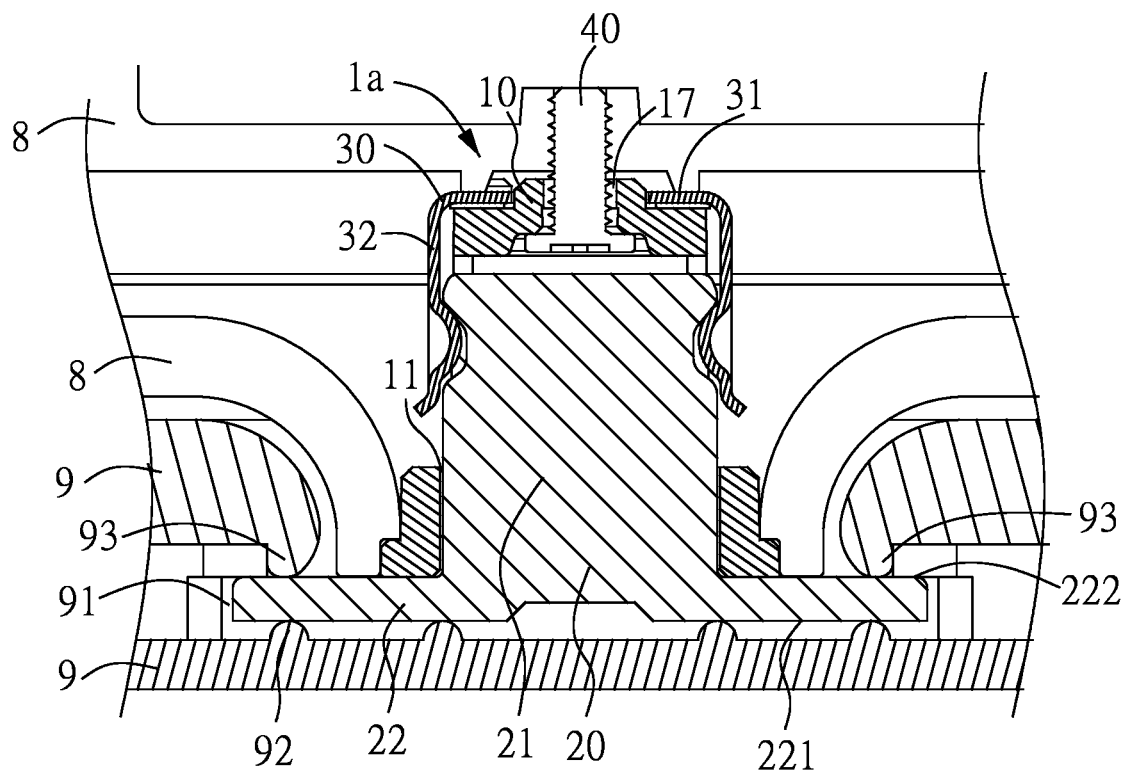
FIG. 7 illustrates a cross-sectional view showing the connecting assembly being installed in the first housing and the second housing according to another embodiment of the present disclosure.

FIG. 7 illustrates a cross-sectional view showing the connecting assembly being installed in the first housing and the second housing according to another embodiment of the present disclosure. Refer to FIG. 7, the difference between the connecting assembly 1a in this embodiment and the connecting assembly 1 in the aforementioned embodiment is that the connecting assembly 1a in this embodiment does not have the washer 50, while other components remain the same as the aforementioned embodiment. In this embodiment, because the connecting assembly 1a does not have the washer 50, the second propping portion 93 of the second housing 9 is directly propped against the upper surface 222 of the annular portion 22 of the connecting base 20. Similarly, the first propping portion 92 is also propped against the lower surface 221 of the annular portion 22 to further limit the connecting base 20 to move downwardly or upwardly. Further, the second propping portion 93 and the annular portion 22 can be plastic members, which can similarly make the connecting base 20 rotate and move within the slot 91 by means of point contact (propping), thereby achieving the effect of adjusting the angle of the first housing 8 (such as the camera housing) described in the aforementioned embodiment.

As described above, the connecting assembly of the present disclosure comprises a general connecting member, a connecting base, and a clamping member. The general connecting member is connected to a first housing, and the connecting base is disposed on a second housing. The general connecting member comprises an accommodating portion and at least one opening. The opening is disposed on a side wall of the general connecting member, and the opening communicates with the accommodating portion. The connecting base comprises a main body, which is disposed in the accommodating portion of the general connecting member. At least one clamping portion of the clamping member passes through the opening and presses against the main body of the connecting base, so as to easily assemble the general connecting member and the connecting base. Further, the main body of the connecting base is directly disposed in the accommodating portion without connecting to other objects by screwing like a conventional female thread does, the effect of easy assembly and time-saving is thereby achieved. Moreover, the connecting assembly can also be used as a quick-release connecting assembly.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims.

What is claimed is:

1. A connecting assembly, applied to connect a first housing and a second housing, the connecting assembly comprising:
   a general connecting member, being connected to the first housing, the general connecting member comprising:
   an accommodating portion, located inside the general connecting member; and at least one opening, disposed on a side wall of the general connecting member, and the opening communicating with the accommodating portion;
   a connecting base, disposed on the second housing, the connecting base comprising a main body, the main body being disposed in the accommodating portion of the general connecting member; and
   a clamping member, comprising:
      a flat portion, disposed on a top portion of the general connecting member; and
      at least one clamping portion, extending from one end of the flat portion toward the connecting base, the clamping portion passing through the opening and pressing against the main body of the connecting base.

2. The connecting assembly as claimed in claim 1, wherein the connecting base further comprises an annular portion being located on a bottom edge of the main body, and the annular portion extending outwardly from the main body.

3. The connecting assembly as claimed in claim 2, wherein an outer diameter of the annular portion is greater than an outer diameter of the general connecting member.

4. The connecting assembly as claimed in claim 2, wherein the second housing comprises a slot, and the annular portion is disposed in the slot of the second housing.

5. The connecting assembly as claimed in claim 4, wherein the second housing comprises a first propping portion and a second propping portion, the first propping portion is located in the slot and is propped against a lower surface of the annular portion, and the second propping portion is propped against an upper surface of the annular portion.

6. The connecting assembly as claimed in claim 4, wherein the second housing comprises a first propping portion and a second propping portion, the first propping portion is located in the slot and is propped against a lower surface of the annular portion, where the connecting assembly further comprises:
   a washer, disposed on an upper surface of the annular portion, and the second propping portion being propped against the washer.

7. The connecting assembly as claimed in claim 1, wherein the main body comprises a groove, and the clamping portion comprises a protrusion, the protrusion is disposed in the groove when the clamping portion passes through the opening.

8. The connecting assembly as claimed in claim 1, wherein the main body comprises a limit portion, the limit portion is located in the opening when the main body is disposed in the accommodating portion.

9. The connecting assembly as claimed in claim 1, wherein the general connecting member comprises a screw hole portion, and the connecting assembly further comprise:
   a screw, used for passing through the screw hole portion and being screwed to the first housing.

10. The connecting assembly as claimed in claim 9, wherein the clamping member comprises a through hole located on the flat portion and being disposed to the outside of the screw hole portion.

11. The connecting assembly as claimed in claim 1, wherein the general connecting member comprises an internal thread located in the accommodating portion.

* * * * *